United States Patent [19]
Kallis

[11] 3,936,771
[45] Feb. 3, 1976

[54] SUBSONIC FLOW AERODYNAMIC WINDOW FOR HIGH ENERGY LASER

[75] Inventor: James M. Kallis, Los Angeles, Calif.

[73] Assignee: Hughes Aircraft Company, Culver City, Calif.

[22] Filed: Mar. 27, 1974

[21] Appl. No.: 455,437

[52] U.S. Cl............................................. 331/94.5 C
[51] Int. Cl.² .......................................... H01S 3/05
[58] Field of Search...................... 331/94.5; 330/4.3

[56] References Cited
UNITED STATES PATENTS

| | | | |
|---|---|---|---|
| 3,617,928 | 11/1971 | Hausmann | 331/94.5 C |
| 3,654,569 | 4/1972 | Hausmann | 331/94.5 C |
| 3,768,035 | 10/1973 | Zar | 331/94.5 C |

Primary Examiner—William L. Sikes
Attorney, Agent, or Firm—W. H. MacAllister, Jr.; F. I. Kozem

[57] ABSTRACT

A subsonic flow aerodynamic window in a high energy gas laser, which seals off the laser optical cavity from the ambient gas, while minimizing the degradation of the laser output beam. Since the flow of the aerodynamic window is subsonic, gas consumption and degradation of the laser output beam are minimized.

2 Claims, 2 Drawing Figures

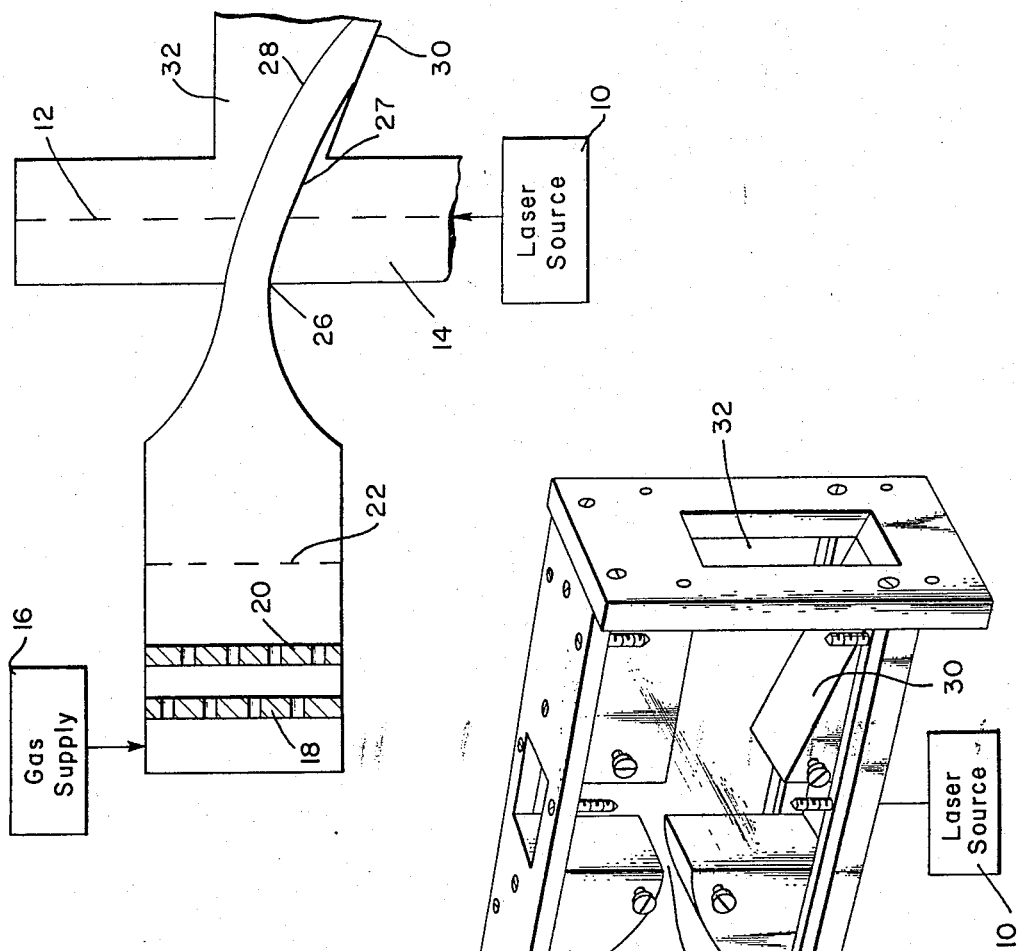
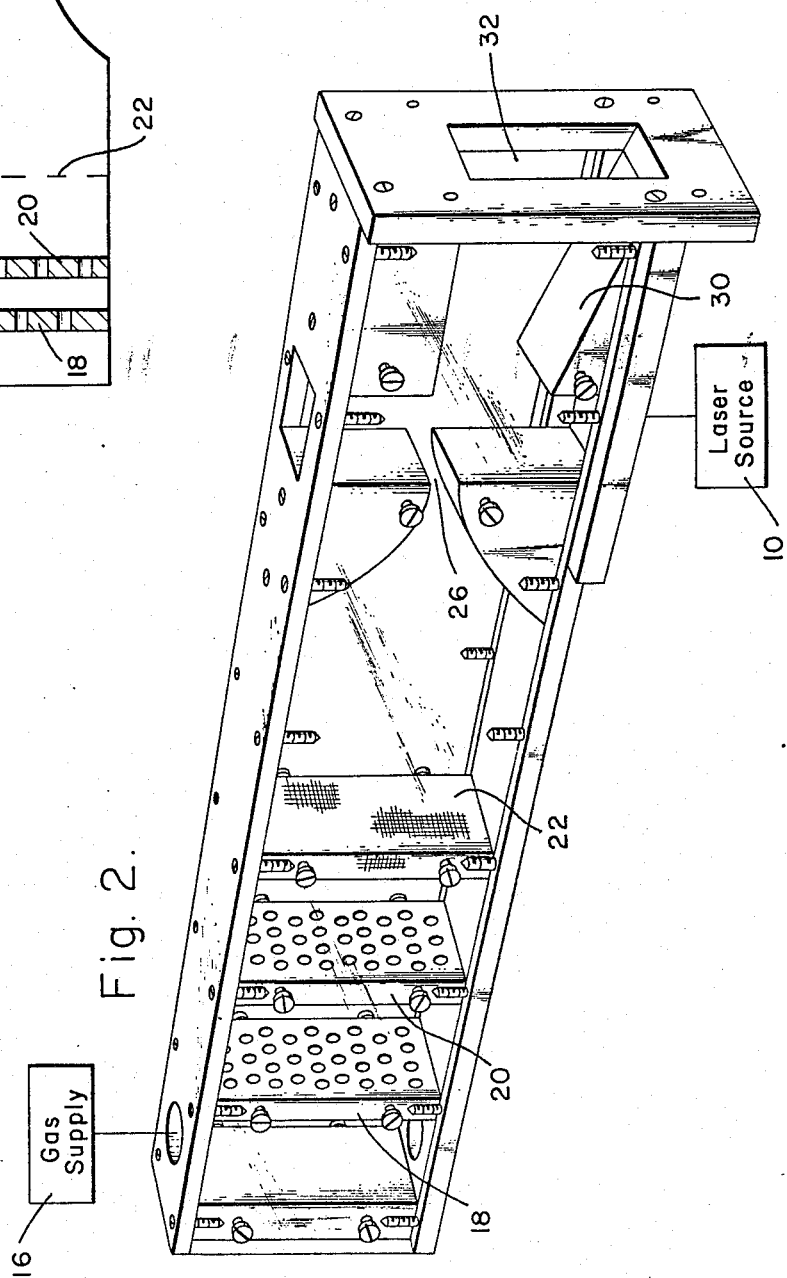

3,936,771

SUBSONIC FLOW AERODYNAMIC WINDOW FOR HIGH ENERGY LASER

BACKGROUND OF THE INVENTION

1. Field of the Invention

This invention relates to high energy gas lasers and, more particularly, to a subsonic flow aerodynamic window in a high energy gas laser system.

2. Description of the Prior Art

In the art, low energy lasers contain windows with physical walls made of materials that transmit the laser wavelength, such as a Brewster window. But, in a high energy gas laser, such a material window would be disintegrated by the laser beam. Therefore, a window must be designed which would permit passage of a laser beam with no physical obstructions and which would prevent a flow of ambient gas into the laser optical cavity. Such an aerodynamic window is described in U.S. Pat. No. 3,617,928, issued to George Hausmann, entitled "Aerodynamic Window for Gas Dynamic Laser," filed May 23, 1968. Another U.S. Pat. No. 3,654,569, entitled "Aerodynamic Window," filed Dec. 23, 1968, also describes an aerodynamic window with no physical walls. These prior windows were invented for use in lasers having cavity pressures typically less than 1/10 of the ambient pressure, in which case the window must have a supersonic jet. The present invention is intended for lasers in which the cavity pressure is on the order of 9/10 of the ambient pressure, in which case the aerodynamic-window jet need not be supersonic.

SUMMARY OF THE INVENTION

The aerodynamic window in accordance with the invention consists of a subsonic jet of gas which flows across the output aperture of the laser cavity in a direction perpendicular to the laser beam's optical axis. The window prevents the ambient gas from flowing into the laser cavity while minimizing degradation of the output laser beam. Since the flow of the jet across the laser cavity is subsonic, less gas in consumed in the jet, and there is less degradation of the output laser beam than in a comparable supersonic-flow window.

Accordingly, it is an object of the invention to provide an aerodynamic window for a high energy gas laser.

It is another object to provide an aerodynamic window whose flow is subsonic.

The features of the present invention which are believed to be novel are set forth with particularity in the appended claims. The present invention, both as to its organization and manner of operation, may be understood best by reference to the following description, taken in connection with the accompanying drawings.

BRIEF DESCRIPTION OF THE DRAWINGS

FIG. 1 is a view of the window flow system, laser optical cavity, and exhaust duct showing the use of the subsonic aerodynamic window in accordance with the present invention in conjunction with a high energy gas laser.

FIG. 2 is a perspective view of the window flow system, laser optical cavity, and exhaust duct of the invention.

DETAILED DESCRIPTION

In FIG. 1, a gas laser source 10 provides a high energy laser beam 12, which is formed in the laser optical cavity 14 and propagates upward. To provide an aerodynamic boundary to prevent the ambient gas from flowing inside the laser optical cavity 14, a high pressure gas from supply 16 flows through the perforated plates 18 and 20, which could be made of materials such as steel or aluminum, and then through screen 22; these components smooth the flow of gas from the gas supply 16. After flowing through the plates and screens, the gas flow then enters the output aperture of the laser optical cavity 14 through a simple convergent nozzle 26, in which the favorable pressure gradient further reduces the turbulence level and accelerates the flow to the desired subsonic Mach number. The jet 27 from the nozzle 26 maintains a pressure difference between the ambient pressure and the pressure in the optical cavity by momentum changes occurred in the jet being deflected towards the optical cavity. In the prior art supersonic flow windows, this deflection occurred across shock waves and expansion waves, whereas in the present subsonic flow window, this deflection occurs on a curved trajectory 28. The pressure $P_C$ in the laser optical cavity is slightly lower than the ambient pressure $P_A$. Therefore, a pressure difference exists across the jet 27, which forces it to bend toward side 30 in a circular arc. The jet attaches to the low pressure side 30 of the exhaust duct 32, thus sealing off the optical cavity from the gas outside the laser. The exhaust duct 32 is designed to exhaust the deflected gas in jet 27 plus the adjacent gas entrained by the jet.

There exist numerous advantages of the subsonic flow aerodynamic window of the present invention over the prior art supersonic-flow windows. (1) The subsonic-flow window is simpler to build than the supersonic-flow window. The dimensions of the supersonic-flow window's nozzle must be carefully calculated and exactly constructed. The supersonic window also must contain an elaborate diffuser to exhaust the gas. Whereas, the subsonic window requires no diffuser and the design of the nozzle is not critical. (2) The subsonic window has greater operational flexibility. The supersonic window operates at only one condition, with a shock wave across the nozzle which barely gets across the laser cavity's aperture. But with the subsonic window, the pressure difference across the jet bends it downward toward side 30 in a circular arc whose curvature in not critical. (3) The subsonic window consumes less gas. (4) The subsonic flow window creates less degradation of the output laser beam. With the supersonic window, there are large density gradients in the flow across the window and shock waves, which cause laser degradation; whereas, with the subsonic window there are no large density changes in the flow across the window and no shock waves. This subsonic aerodynamic window allows high energy laser beam to be extracted from the optical cavity with minimal degradation of the laser beam, because the subsonic flow of the aerodynamic window will minimize degradation of the output laser beam.

Although the device which has just been described appears to afford the greater advantages for implementing the invention, it will be understood that various modifications may be made thereto without going beyond the scope of the invention, it being possible to replace certain elements by other elements capable of fulfilling the same technical function therein.

What is claimed is:

1. A subsonic flow aerodynamic window in a high energy gas laser, which seals off the laser optical cavity from the ambient gas while minimizing the degradation of the laser output beam, comprising:
   a gas laser for providing a laser beam including a laser cavity and an outlet chamber for said beam to traverse;
   an entrance in said chamber for receiving said laser beam from said laser cavity;
   means connected to a flow system for providing a gas for producing a subsonic gas jet flowing transversely to said laser output beam for sealing off said chamber from the ambient gas with reduced degradation of said output laser beam;
   an exhaust duct transverse to said chamber for exhausting said gas jet;
   convergent nozzle for acceleration of the gas to provide said subsonic flow; and
   a plurality of plates and screens positioned in said cavity between said means and said convergent nozzle for reducing the turbulence of the gas jet.

2. A subsonic flow aerodynamic window in a high energy gas laser, which seals off the laser optical cavity from the ambient gas comprising:
   means for providing a laser beam;
   a gas laser power amplifier;
   said amplifier including a laser cavity for amplifying said laser beam;
   an inlet chamber for said beam to enter said cavity;
   an outlet chamber for said beam to exist said cavity;
   a duct in said chamber for receiving said beam;
   means connected to a flow system for providing a gas for producing a subsonic gas jet flowing transversely to said laser beam for sealing off said cavity from the ambient gas with reduced degradation of said laser beam;
   an exhaust duct transverse to said cavity for exhausting said gas jet;
   a convergent nozzle for acceleration of the gas to provide said subsonic flow; and
   a plurality of plates and screens positioned in said cavity between said means and said convergent nozzle for reducing the turbulance of the gas jet.

* * * * *